(12) United States Patent
Souto et al.

(10) Patent No.: US 8,260,763 B2
(45) Date of Patent: Sep. 4, 2012

(54) MATCHING SERVICE ENTITIES WITH CANDIDATE RESOURCES

(75) Inventors: Farlon de Alencar Souto, Porto Alegre (BR); Leonardo Fagundes Da Silva, Porto Alegre (BR); Filipe Gomes Esperandio, Porto Alegre (BR)

(73) Assignee: Hewlett-Packard Devlopment Company, L.P., Houston, TX (US)

( * ) Notice: Subject to any disclaimer, the term of this patent is extended or adjusted under 35 U.S.C. 154(b) by 227 days.

(21) Appl. No.: 12/688,007

(22) Filed: Jan. 15, 2010

(65) Prior Publication Data

US 2011/0179041 A1 Jul. 21, 2011

(51) Int. Cl.
G06F 17/30 (2006.01)

(52) U.S. Cl. ........................................ 707/707

(58) Field of Classification Search .................. 707/602, 707/707
See application file for complete search history.

(56) References Cited

U.S. PATENT DOCUMENTS

| | | | |
|---|---|---|---|
| 5,319,781 A * | 6/1994 | Syswerda | 705/7.25 |
| 5,491,818 A * | 2/1996 | Malatesta et al. | 1/1 |
| 5,613,111 A * | 3/1997 | Malatesta et al. | 1/1 |
| 5,701,469 A * | 12/1997 | Brandli et al. | 1/1 |
| 5,937,422 A * | 8/1999 | Nelson et al. | 715/206 |
| 6,185,528 B1 * | 2/2001 | Fissore et al. | 704/232 |
| 6,754,625 B2 * | 6/2004 | Olsen et al. | 704/235 |
| 6,850,895 B2 * | 2/2005 | Brodersen et al. | 705/7.14 |
| 6,886,010 B2 * | 4/2005 | Kostoff | 1/1 |
| 6,938,256 B2 * | 8/2005 | Deng et al. | 718/104 |
| 6,985,901 B1 * | 1/2006 | Sachse et al. | 1/1 |
| 7,076,746 B2 * | 7/2006 | Hamlin et al. | 716/52 |
| 7,213,065 B2 | 5/2007 | Watt | |
| 7,225,460 B2 * | 5/2007 | Barzilai et al. | 726/1 |
| 7,315,849 B2 * | 1/2008 | Bakalash et al. | 1/1 |
| 7,316,020 B2 | 1/2008 | Raja et al. | |
| 7,333,982 B2 * | 2/2008 | Bakalash et al. | 707/600 |
| 7,447,678 B2 * | 11/2008 | Taylor et al. | 1/1 |
| 7,599,938 B1 * | 10/2009 | Harrison, Jr. | 705/7.29 |
| 7,720,808 B2 * | 5/2010 | Lin et al. | 707/603 |
| 7,730,060 B2 * | 6/2010 | Chakrabarti et al. | 707/723 |
| 7,756,884 B2 * | 7/2010 | Okabe et al. | 707/758 |
| 7,809,709 B1 * | 10/2010 | Harrison, Jr. | 707/707 |
| 7,809,793 B2 * | 10/2010 | Kimura et al. | 709/205 |
| 7,814,459 B2 * | 10/2010 | Behnen et al. | 717/104 |
| 7,827,178 B2 * | 11/2010 | Ishii et al. | 707/736 |
| 7,895,563 B2 * | 2/2011 | Carlson et al. | 717/102 |
| 7,908,242 B1 * | 3/2011 | Achanta | 707/602 |
| 7,921,100 B2 * | 4/2011 | Hadjieleftheriou et al. | 707/713 |

(Continued)

OTHER PUBLICATIONS

H. Ludwig et al., "Template-Based Automated Service Provisioning—Supporting the Agreement-Driven Service Life-Cycle," B. Benatallah, F. Casati, and P. Traverso (Eds.): ICSOC 2005, LNCS 3826, pp. 283-295, 2005; Copyright Springer-Verlag Berlin Heidelberg 2005.

(Continued)

Primary Examiner — Mark Andrew X Radtke

(57) ABSTRACT

A method comprises using a processor to list candidate resources that may be matched with a plurality of service entities. The method also comprises eliminating at least one possible match between the candidate resources and the plurality of service entities. The method further comprises, for each of the plurality of service entities, rating the candidate resources. The method still further comprises ranking the plurality of service entities. The method still further comprises matching each of the plurality of service entities with at least one of the candidate resources.

19 Claims, 4 Drawing Sheets

U.S. PATENT DOCUMENTS

| | | | | |
|---|---|---|---|---|
| 7,921,105 B2* | 4/2011 | Toyoda et al. | | 707/722 |
| 8,010,499 B2* | 8/2011 | Dettinger et al. | | 707/665 |
| 8,019,795 B2* | 9/2011 | Anderson et al. | | 707/803 |
| 8,122,015 B2* | 2/2012 | Liu et al. | | 707/723 |
| 2002/0046157 A1* | 4/2002 | Solomon | | 705/37 |
| 2002/0087408 A1* | 7/2002 | Burnett | | 705/14 |
| 2003/0014379 A1* | 1/2003 | Saias et al. | | 706/45 |
| 2003/0028896 A1* | 2/2003 | Swart et al. | | 725/127 |
| 2004/0064438 A1* | 4/2004 | Kostoff | | 707/1 |
| 2004/0246922 A1* | 12/2004 | Ruan et al. | | 370/331 |
| 2006/0015512 A1* | 1/2006 | Alon et al. | | 707/100 |
| 2006/0036743 A1* | 2/2006 | Deng et al. | | 709/227 |
| 2006/0190536 A1* | 8/2006 | Strong et al. | | 709/204 |
| 2006/0212477 A1* | 9/2006 | Murphy et al. | | 707/104.1 |
| 2006/0218159 A1* | 9/2006 | Murphy et al. | | 707/100 |
| 2006/0242131 A1* | 10/2006 | Okabe et al. | | 707/3 |
| 2007/0143332 A1* | 6/2007 | Lin et al. | | 707/102 |
| 2008/0019267 A1* | 1/2008 | Ku et al. | | 370/229 |
| 2008/0120334 A1* | 5/2008 | Etgar | | 707/103 Y |
| 2008/0162417 A1* | 7/2008 | Morris et al. | | 707/2 |
| 2008/0222238 A1* | 9/2008 | Ivanov et al. | | 709/202 |
| 2008/0250057 A1* | 10/2008 | Rothstein et al. | | 707/102 |
| 2008/0281974 A1* | 11/2008 | Slothouber et al. | | 709/229 |
| 2008/0313178 A1* | 12/2008 | Bates | | 707/5 |
| 2009/0063518 A1* | 3/2009 | Jung et al. | | 707/100 |
| 2009/0088176 A1 | 4/2009 | Teo et al. | | |
| 2009/0180430 A1 | 7/2009 | Fadell | | |
| 2009/0198678 A1* | 8/2009 | Conrad et al. | | 707/5 |
| 2010/0082517 A1* | 4/2010 | Schapker et al. | | 706/47 |
| 2010/0145929 A1* | 6/2010 | Burger et al. | | 707/713 |
| 2010/0205541 A1* | 8/2010 | Rapaport et al. | | 715/753 |
| 2010/0223239 A1* | 9/2010 | Madsen et al. | | 707/695 |
| 2010/0280991 A1* | 11/2010 | Chen et al. | | 707/602 |
| 2011/0040771 A1* | 2/2011 | Gilyadov et al. | | 707/754 |
| 2011/0113005 A1* | 5/2011 | He et al. | | 707/602 |
| 2011/0113094 A1* | 5/2011 | Chunilal | | 709/204 |

OTHER PUBLICATIONS

Hewlett-Packard Development Company, L.P., "HP Introduces Industry's First Business-ready Infrastructure for Automated Service Delivery in Data Centers," Berlin, Apr. 20, 2009 [Online] http://www.hp.com/hpinfo/newsroom/press/2009/090420c.html.

R. Golding et al., "Persistent Storage for Distributed Applications," Proceedings of the 8th ACM SIGOPS European workshop on support for composing distributed applications, Sintra, Portugal, 1998, pp. 53-57.

* cited by examiner

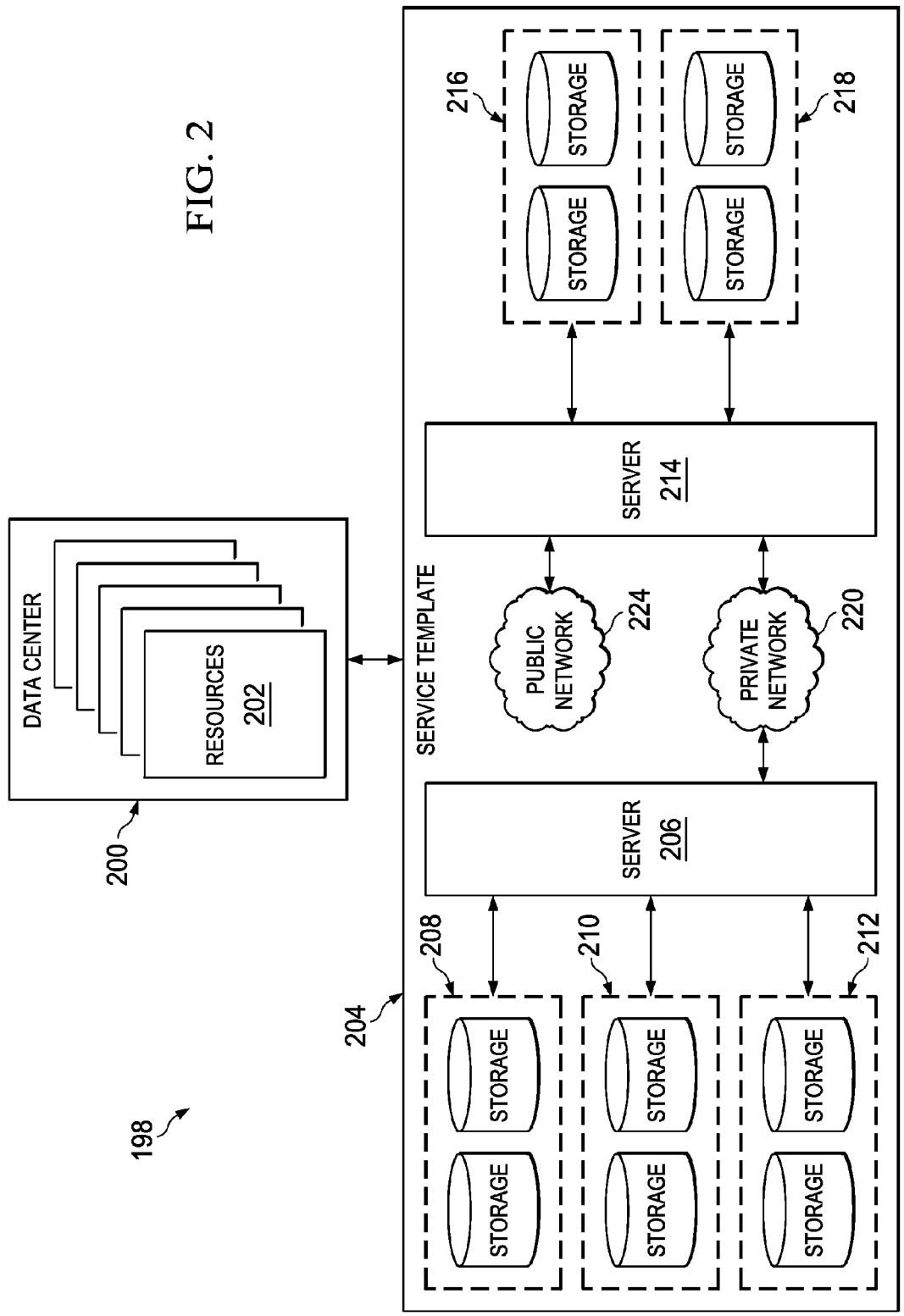

MATCHING SERVICE ENTITIES WITH CANDIDATE RESOURCES

BACKGROUND

Resources are allocated to entities in a variety of contexts. For instance, resources such as storage devices, network connections, etc., may be assigned to entities like administrative servers and personal computers of a computer network so that the entities may perform some predetermined function or service using those resources. Networks often are complex and can have resource requirements that are so strict and intricate that properly allocating resources to entities in such networks becomes a logistically challenging endeavor.

BRIEF DESCRIPTION OF THE DRAWINGS

For a detailed description of exemplary embodiments of the invention, reference will now be made to the accompanying drawings in which:

FIG. 2 shows a block diagram of another system implementing the techniques disclosed herein, in accordance with embodiments;

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. A "list" includes one or more items.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are embodiments of a technique whereby resources may be quickly and efficiently allocated to a plurality of entities. In general, the technique comprises listing one or more candidate resources with which each service entity may be associated. The technique also comprises custom fitting the candidate resources to the service entities by determining which candidate resource(s) may be inappropriate for each service entity and eliminating those candidate resource(s) from the list of candidate resources for that particular entity. The technique further comprises, for each entity, rating the remaining candidate resources to identify those candidate resources with which the entity would preferably be associated and those resources with which the entity would preferably not be associated. The technique still further comprises ranking the service entities using one or more factors (e.g., importance of the service that each entity provides). Finally, the technique comprises associating candidate resources with service entities using the ratings, rankings and/or any other suitable information.

Figure 1:
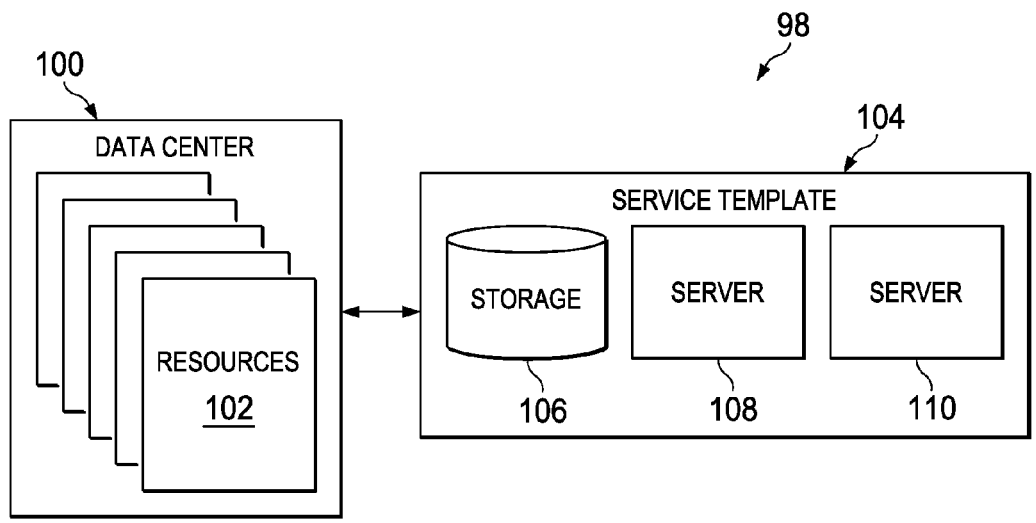
FIG. 1 shows a block diagram of a system implementing the techniques disclosed herein, in accordance with embodiments.

FIG. 1 shows a conceptual block diagram of a system 98 implementing the techniques disclosed herein, in accordance with embodiments. The system 98 comprises a data center 100 and a service template 104. The data center 100 comprises a location in which electronic resources 102 are maintained. In some embodiments, the data center 100 comprises an electronic data center that includes a plurality of electronic/computer-based resources, such as personal computers, servers, storage devices, electronic communication infrastructure (e.g., networking equipment), networks, software, virtual machines, etc.

The service template 104 comprises an organizational model of one or more electronic service entities. Stated in another way, the service template 104 is a model that describes how one or more electronic service entities relate to each other. Service entities are electronic entities of any type that perform some service or function using one or more of the aforementioned resources. The service template 104 may be created by a user of the system 98 using, e.g., a software program. Thus, for instance, a network engineer who desires to determine how best to allocate a fixed number of computer resources to various electronic service entities throughout his company may do so by first using a software program to design a service template 104 that accurately depicts his company's electronic infrastructure. Service template 104 also may be acquired from other sources, such as by downloading the template from a network or obtaining the template from removable storage media.

The service template 104 may include a wide variety of information, such as electronic service entities, relationships between electronic service entities, relationships between electronic service entities and other entities, capabilities of electronic service entities, environments in which electronic service entities are disposed, locations of the electronic service entities, preferences of electronic service entities, etc. Not all of these possible information types are explicitly shown in the service templates of FIGS. 1-2 but may nevertheless be present. In some embodiments, a service template 104 may take the form of a computer file stored on a storage medium such as volatile memory (e.g., random access memory (RAM)) and/or non-volatile memory (e.g., a hard drive). In the illustrative example provided in FIG. 1, the service template 104 shows three electronic service entities: storage 106, server 108 and server 110. These electronic service entities do not couple to each other and are of minimal complexity. Thus, the techniques disclosed below may allocate electronic resources 102 to the storage 106, server 108 and/or server 110 with minimal difficulty.

The system 198 of FIG. 2 is more complex than system 98 of FIG. 1. The system 198 comprises a data center 200 that includes a plurality of electronic resources 202. The service template 204 depicts a server 206 that couples to storage 208, storage 210 and storage 212. The service template 204 also illustrates a server 214 that couples to storage 216 and storage 218. The servers 206 and 214 communicate with each other by way of a private network 220. The server 214 also communicates with a public network 224, but server 206 does not. Compared with the service template 104 of FIG. 1, the service template 204 of FIG. 2 describes a substantially more complex system of electronic service entities that involve different types of entities, different connections between the entities, etc. Establishing an allocation scheme in the service template 204 is thus more logistically challenging than is establishing an allocation scheme in the service template 104 of FIG. 1. Given this increased complexity, an automated technique that quickly converges on a proposed allocation scheme—such as that described below—is beneficial.

Figure 3:
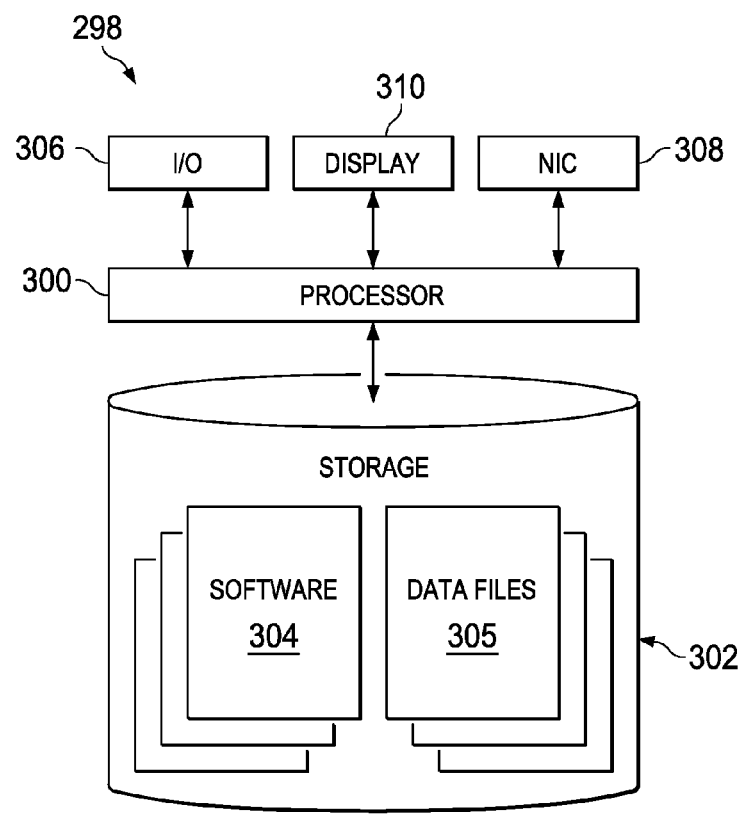
FIG. 3 shows a block diagram of an illustrative hardware and software system that is usable to implement the techniques disclosed herein, in accordance with embodiments.

Prior to describing the automated technique, brief reference is made to FIG. 3, which shows a block diagram of an illustrative computer system 298 that is usable to implement the automated technique disclosed herein, in accordance with embodiments. The system 298 comprises a processor 300, storage 302 including software 304 and data files 305, input/output (I/O) apparatus 306, a network interface card (NIC) 308 and a display 310. The processor 300 executes the software 304 to perform at least some of the actions described herein. Software 304 is usable to create service templates, to perform the resource allocation technique described below, etc. Data files 305 may include, for instance, a service template generated using the software 304. Multiple types of software 304 and data files 305 may be included on storage 302, and the scope of this disclosure encompasses any and all such variations.

A user may interact with the computer system 298 using the I/O apparatus 306 and the display 310. The software 304, when executed by the processor 300, causes the processor 300 to display service templates on the display 310. Using such displays, the user may build the service templates by specifying parameters, electronic service entities, etc. using the I/O apparatus 306. Other resources accessible via, e.g., the NIC 308 also may be used in generating service templates. Created service templates may be stored as data files 305. Other software 304, when executed by the processor 300, may cause the processor 300 to use the data files 305 and any other appropriate software to perform the steps of the method of FIG. 4, which is now described below.

Figure 4:
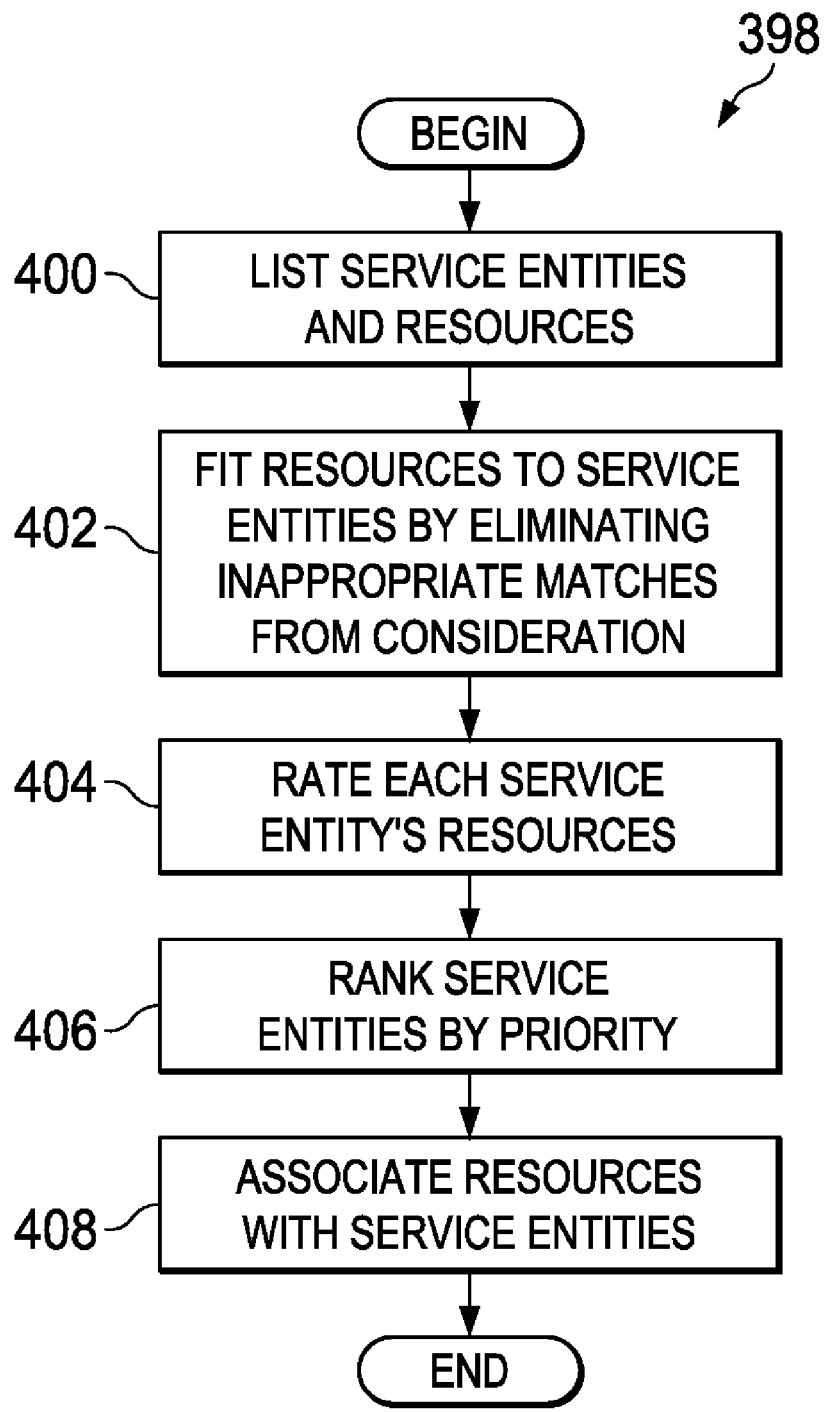
FIG. 4 shows a flow diagram of an illustrative method implemented in accordance with embodiments.
Figure 5:
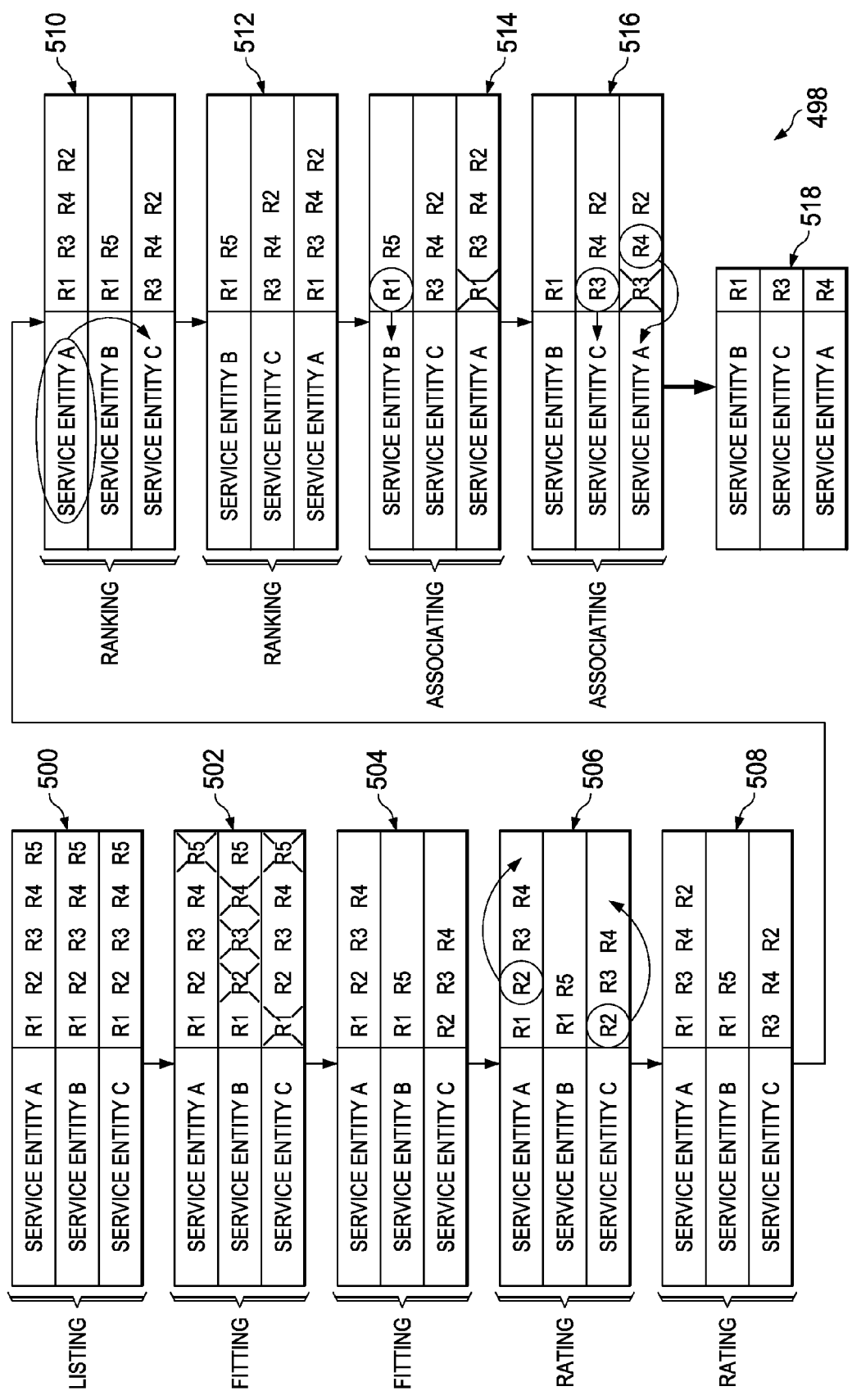
FIG. 5 shows an illustrative implementation of the techniques disclosed herein, in accordance with embodiments.

FIG. 4 shows a flow diagram of an illustrative method 398 implemented in accordance with embodiments, the steps of which may be performed by the processor 300 of FIG. 3 and may be performed in any suitable order or even concurrently. FIG. 5 shows an illustrative implementation 498 of the techniques disclosed herein, in accordance with embodiments. FIGS. 4 and 5 are now described together. The method 398 begins by listing all electronic candidate resources that may be applied to each electronic service entity (block 400). An illustration of this step is shown in implementation 498 of FIG. 5. Specifically, listing step 500 shows electronic service entities A, B and C and resources R1-R5 listed for each of these electronic service entities. In some embodiments, the processor 300 may discover these resources R1-R5 by searching networks to which it couples by way of the NIC 308. In some embodiments, a user may provide information regarding these resources R1-R5 directly to the processor 300 using I/O apparatus 306 or some other suitable technique (e.g., by coupling storage media comprising such information to the computer system 298). Electronic candidate resources may be identified using any suitable technique(s).

Referring to FIG. 4, the method 398 also comprises fitting the electronic candidate resources to each of the electronic service entities by eliminating inappropriate matches from consideration (block 402). Referring to FIG. 5, the fitting step 502 shows electronic resource R5 as inappropriate for electronic service entity A, electronic resources R2-R4 as inappropriate for electronic service entity B, and electronic resources R1 and R5 as inappropriate for electronic service entity C. These electronic resources may be deemed inappropriate for the corresponding electronic service entities for various reasons. For example, the processor 300 may gather attributes regarding these electronic resources and compare them to attributes associated with the electronic service entities. Electronic resource and/or service entity attributes may be gathered from one or more networks using the NIC 308 or they may be provided by a user or by any other suitable technique. Further, the rules by which the processor 300 compares such attributes may be obtained using the NIC 308 or may be provided directly by a user or by some other suitable technique. Such rules dictate how attributes should be compared or otherwise evaluated by the processor 300. Based on such comparisons, the processor 300 eliminates inappropriate potential matches, as shown in fitting step 502 of FIG. 5. Fitting step 504 omits display of the eliminated potential matches. Other techniques also may be used to eliminate inappropriate potential matches.

Method 398 continues by rating each electronic service entity's resources (block 404). In this step, each electronic service entity's resources are evaluated independently of other electronic service entities' resources. Specifically, a single entity's electronic resources are compared to each other to determine which electronic resource(s) would most preferably be assigned to that entity and the order of such preference. As shown in rating step 506 of FIG. 5, for electronic service entity A, resource R2 is least preferred and is thus preferably moved to "last place." Similarly, for electronic service entity C, resource R2 is least preferred and is thus preferably moved to "last place."

The resulting orders of preference are shown in rating step 508. Specifically, rating step 508 indicates that electronic service entity A would most preferably be assigned resource R1; if R1 is unavailable, then resource R3; if R3 is unavailable, then resource R4; if R4 is unavailable, then resource R2. Electronic service entity B's order of preference is R1 and R5, while electronic service entity C's order of preference is R3, R4 and R2.

The processor 300 may rate resources based on various information obtained via the NIC 308, a user, or any other suitable source. In at least some embodiments, resources are rated based on how frequently they appear on other electronic service entities' lists. For example, if a first electronic service entity has a list of electronic candidate resources that includes Resource 1 and Resource 2, while a second service entity has a list of electronic candidate resources that includes Resources 1-20, then Resources 1 and 2 for the second electronic service entity will be moved to the end of that entity's list of candidate resources because assigning either Resource 1 or Resource 2 to the second electronic service entity would significantly limit the electronic candidate resources available to the first electronic service entity. In some embodiments, electronic resources may be rated based on how efficient they are (e.g., their relative level of consumption of other resources), with less-consuming resources being ranked higher than more-consuming resources.

The method 398 further comprises ranking electronic service entities by priority (block 406). For example, some electronic service entities may be more important than others (e.g., may perform more vital functions in a network context; may be a client that generates more revenue in a business context) and thus may be ranked higher and given greater preference during resource allocation. Referring to FIG. 5, as shown in ranking step 510, electronic service entity A is of lower priority than electronic service entities B and C. Thus, as shown in ranking step 512, electronic service entity A is moved to the "bottom of the stack" due to its relative unimportance. Importance levels may be obtained using the NIC 308, a user, or any other suitable means. Further, the software 304 may be programmed to give greater weight to some factors over others when determining which electronic service entity should be "first in line" and which electronic service entity should not.

For instance, the software 304 may give relatively significant importance to the number of electronic candidate resources in each electronic service entity's list of electronic candidate resources. An electronic service entity with a list of relatively few electronic candidate resources may be ranked higher than an electronic service entity with a list having more electronic candidate resources. For instance, as shown in ranking steps 510 and 512 in FIG. 5, electronic service entity A has the most electronic candidate resources while electronic service entity B has the fewest, so electronic service entity B is ranked highest and electronic service entity A is ranked lowest.

Finally, the method 398 comprises associating (or "matching" or "allocating") the electronic resources with (or, stated in another way, allocating electronic resources to) electronic service entities (block 408). As shown in FIG. 5, associating step 514, association is performed first using the highest-ranked electronic service entity. In the present example, the highest-ranked electronic service entity is service entity B, and service entity B's most preferred electronic candidate resource is resource R1, so resource R1 is allocated to service entity B. Because resource R1 is allocated to service entity B, resource R1 is eliminated from the lists of possible resources for all other service entities (in the present example, for service entity A).

Further, as shown in associating step 516, because electronic service entity C is the second-highest ranked service entity, and because service entity C's most preferred electronic candidate resource is resource R3, resource R3 is allocated to service entity C, as shown in associating step 514 of FIG. 5. As a result, resource R3 is removed as a candidate from other electronic service entities' lists.

Further still, as shown in associating step 516, electronic service entity A is the third-highest ranked service entity, and because service entity A's most preferred electronic candidate resource is resource R4, resource R4 is allocated to service entity A. As a result, resource R4 is removed as a candidate from other service entities' lists. The final, resulting allocation of resources is shown in step 518. In some embodiments, if at least one of the electronic service entities fails to find a matching electronic candidate resource, then one or more of the associations that were successfully established are eliminated. In such cases, successful associations are eliminated because the failure of even one electronic service entity to find a proper match is considered to be an overall failure of the matching process.

Such allocations may be stored to storage among the data files 305 or may be transmitted elsewhere using NIC 308. The processor 300 may, alternatively, immediately implement the allocations by way of the NIC 308 or some other connection to the computer system 298.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   determining, by a processor, a list of candidate resources that may be matched with a plurality of service entities;
   eliminating, by said processor, at least one possible match between said candidate resources and said plurality of service entities;
   for each of the plurality of service entities, rating said candidate resources by said processor, giving lower ratings to candidate resources that are present in one or more lists of matches of one or more other service entities;
   ranking, by said processor, the plurality of service entities; and
   matching, by said processor, each of the plurality of service entities with at least one of said candidate resources, wherein a rank of a service entity is proportional to how many of said candidate resource can match with the service entity.

2. The method of claim 1, wherein using a processor to determine said candidate resources comprises using said processor to scour a network to which said processor is connected to determine said candidate resources.

3. The method of claim 1, wherein said elimination comprises comparing candidate resource attributes to service entity attributes.

4. The method of claim 3, wherein comparing candidate resource attributes to service entity attributes comprises using service entity attribute information selected from the group consisting of: locations of said service entities; interconnections between said service entities; interconnections between said service entities and other hardware or software; capabilities of said service entities; and environmental factors associated with said service entities.

5. The method of claim 1, wherein rating said candidate resources for each of the plurality of service entities comprises giving higher ratings to candidate resources that consume fewer other resources.

6. The method of claim 1, wherein ranking said plurality of service entities comprises ranking as highest those service entities that correspond to the fewest candidate resources after said eliminating step.

7. The method of claim 1, wherein said matching comprises using at least one of said candidate resource ratings and at least one of said service entity rankings.

8. The method of claim 1, further comprising removing allocated candidate resources from the one or more lists of the one or more service entities.

9. The method of claim 1, further comprising eliminating one or more allocations if at least one of the one or more lists is empty.

10. A computer-readable storage medium comprising executable code, which, when executed, causes a processor to:
   determine, for each of a plurality of entities, a list of possible resources with which said entity could be matched;
   refine one or more of said lists so as to eliminate, for at least one of the plurality of entities, one or more possible resources;
   for each of the plurality of entities, rate said possible resources according to predetermined criteria including a frequency of appearances in one or more lists of other entities;

rank said plurality of entities; and associate at least one of the plurality of entities with at least one of said possible resources, wherein a rank of an entity is proportional to how many resources can be associated with the service entity.

11. The storage medium of claim 10, wherein, if any one of the plurality of entities fails to be associated with a possible resource, then, as a result, the processor eliminates the association between said at least one of the plurality of entities and the at least one of said possible resources.

12. The storage medium of claim 10, wherein the processor searches a network to which the processor couples to locate said possible resources.

13. The storage medium of claim 10, wherein, to refine the one or more of said lists, the processor compares entity attributes to resource attributes.

14. The storage medium of claim 13, wherein said entity attributes are selected from the group consisting of: locations of the entities;
   interconnections between said entities and other hardware or software;
   interconnections between said entities; capabilities of said entities; and
   environmental factors associated with said entities.

15. The storage medium of claim 10, wherein said predetermined criteria includes a degree of consumption of other resources.

16. The storage medium of claim 10, wherein the processor ranks the plurality of entities in accordance with lengths of said lists.

17. A system, comprising:
   a processor;
   a display coupled to the processor; and
   an input device coupled to the processor;
   wherein the display and input device are usable to generate a service template, said service template describing service entity attributes associated with electronic service entities;
   wherein the processor uses candidate resource attributes, rules and said service entity attributes to determine one or more lists of which of a plurality of electronic candidate resources can match with said electronic service entities;
   wherein the processor rates said plurality of electronic candidate resources, ranks said electronic service entities, and uses said ratings and rankings to associate at least one of the plurality of electronic candidate resources with at least one of said electronic service entities;
   wherein rating said candidate resources for each of the plurality of service entities comprises, for each of the plurality of service entities, giving lower ratings to candidate resources that are present in the one or more lists of one or more other service entities; and
   wherein a ranking of an electronic service entity is proportional to how many of said electronic candidate resources can match with the electronic service entity.

18. The system of claim 17, wherein, to rate the electronic candidate resources, the processor determines and uses a degree of resource consumption for at least one of the electronic candidate resources.

19. The system of claim 17, wherein the plurality of electronic candidate resources are selected from the group consisting of computers, servers, storage, electronic communication infrastructure, networks, software and virtual machines.

* * * * *

UNITED STATES PATENT AND TRADEMARK OFFICE
CERTIFICATE OF CORRECTION

PATENT NO. : 8,260,763 B2
APPLICATION NO. : 12/688007
DATED : September 4, 2012
INVENTOR(S) : Farlon de Alencar Souto et al.

Page 1 of 1

It is certified that error appears in the above-identified patent and that said Letters Patent is hereby corrected as shown below:

On the title page, item (73), Assignee, in column 1, line 1, delete "Devlopmnet" and insert -- Development --, therefor.

Signed and Sealed this
Twenty-eighth Day of May, 2013

Teresa Stanek Rea
*Acting Director of the United States Patent and Trademark Office*